(12) United States Patent
Schroeder, III

(10) Patent No.: US 7,565,817 B2
(45) Date of Patent: Jul. 28, 2009

(54) METHOD OF MAKING A GLASS ENVELOPE

(75) Inventor: Joseph Francis Schroeder, III, Corning, NY (US)

(73) Assignee: Corning Incorporated, Corning, NY (US)

( * ) Notice: Subject to any disclaimer, the term of this patent is extended or adjusted under 35 U.S.C. 154(b) by 677 days.

(21) Appl. No.: 11/303,578

(22) Filed: Dec. 15, 2005

(65) Prior Publication Data
US 2006/0130523 A1 Jun. 22, 2006

Related U.S. Application Data

(60) Provisional application No. 60/637,979, filed on Dec. 20, 2004.

(51) Int. Cl.
*C03B 29/02* (2006.01)
*C03B 32/02* (2006.01)

(52) U.S. Cl. ............................. 65/33.2; 65/36

(58) Field of Classification Search ............... 65/30.11, 65/30.13, 32.3, 33.2, 36
See application file for complete search history.

(56) References Cited

U.S. PATENT DOCUMENTS

| | | | | |
|---|---|---|---|---|
| 3,598,471 A | | 8/1971 | Baldwin et al. ............. 350/162 |
| 3,691,045 A | | 9/1972 | Lieberman et al. .......... 204/192 |
| 3,734,745 A | | 5/1973 | Randall et al. .............. 106/47 |
| 4,130,437 A | | 12/1978 | Mazeau et al. .............. 106/54 |
| 4,238,704 A | * | 12/1980 | Bonk et al. .................. 313/113 |
| 4,961,768 A | * | 10/1990 | Djeu ............................ 65/392 |
| 5,045,510 A | | 9/1991 | Kohli et al. ................... 501/66 |
| 5,489,321 A | * | 2/1996 | Tracy et al. .................. 65/43 |
| 5,534,041 A | | 7/1996 | Havens et al. .............. 65/30.1 |
| 5,693,111 A | * | 12/1997 | Kadowaki et al. ............ 65/43 |
| 5,820,435 A | * | 10/1998 | Cooper et al. ................ 445/25 |
| 6,262,389 B1 | * | 7/2001 | Koyama et al. ........ 219/121.71 |
| 6,820,445 B2 | * | 11/2004 | Gratrix ......................... 65/387 |
| 6,912,087 B1 | | 6/2005 | Borrelli et al. .............. 359/492 |
| 6,998,776 B2 | * | 2/2006 | Aitken et al. ................ 313/512 |
| 7,204,102 B1 | * | 4/2007 | Eames et al. ................. 65/36 |
| 2004/0198582 A1 | | 10/2004 | Borrelli et al. .............. 501/56 |
| 2004/0206953 A1 | | 10/2004 | Morena et al. .............. 257/40 |
| 2005/0141847 A1 | | 6/2005 | Schroeder et al. ........... 385/147 |

* cited by examiner

*Primary Examiner*—John Hoffmann
(74) *Attorney, Agent, or Firm*—Kevin M. Able

(57) ABSTRACT

The coefficient of absorption of a pre-selected region of a glass sheet is preferentially increased. The glass sheet may thereafter be sealed to a substrate using a sealing laser. In one embodiment, the coefficient of absorption sheet is increased by irradiating the glass sheet at a wavelength of about 248 nm, preferably through a mask, to produce an irradiated pattern on the glass sheet having a pre-determined shape. The glass sheet is then heat treated, placed over a substrate and sealed to the substrate by exposing the irradiated pattern to a sealing laser light having a wavelength in the range between about 355 nm and 532 nm to produce a glass envelope. The method disclosed herein is useful, inter alia, for manufacturing electroluminescent devices, such as light emitting diodes (LEDs) and in particular organic light emitting diodes (OLEDs).

17 Claims, 4 Drawing Sheets

METHOD OF MAKING A GLASS ENVELOPE

This application claims the benefit of priority under 35 U.S.C. § 119(e) of U.S. Provisional Application Ser. No. 60/637,979, filed on 20 Dec. 2004.

BACKGROUND OF THE INVENTION

1. Field of the Invention

The present invention relates to a method for sealing glass articles, more particularly a method for encapsulating an electro-luminescent element.

2. Technical Background

There is an increasing demand for OLED devices in display applications, and work is progressing toward applying OLEDs for general lighting. One drawback to the use of OLEDs has been a relatively short life when compared with more traditional light emitting diodes (LEDs). Factors which may affect the lifetime of the device include moisture and/or oxygen which may ingress into the encapsulated electro-luminescent elements of the device. As use times increase for OLED devices, the possibility of device failure due to oxidation of the electrodes, detachment of the electro-luminescent layers, or cracking of the organic elements also increases. Hermetic glass envelopes have been seen as one way in which to mitigate these effects. However, the relatively high temperatures required for sealing glass encapsulation layers to substrates may, in and of themselves, degrade the performance of the thermally sensitive organic layers of the device. Thus, there has been a widespread effort in the industry to develop more benign methods of sealing the cover glass to the substrate, such as through the use of glass frits or other non-glass adhesives such as ultraviolet (UV) cured resins. Unfortunately, non-glass adhesives have proven to be undesirable for long lifetime devices due to their permeability by moisture and out-gassing by the adhesive material. On the other hand, glass frits disposed between the substrate and the glass cover must simultaneously have a low melting temperature and have a coefficient of thermal expansion (CTE) which is closely matched to the cover glass and/or substrate.

SUMMARY

Briefly described, an embodiment of the method for making a glass envelope suitable for use in electro-luminescent devices, such as organic light emitting diodes (OLED), among others, can be implemented as described herein.

The method comprises increasing the optical absorption of a portion of a glass sheet at a wavelength in the range between about 300 nm and 600 nm, positioning the glass sheet over a substrate, and exposing the portion of the glass sheet to optical energy at the wavelength to fuse the glass sheet to the substrate to form a glass envelope.

In another embodiment, a glass envelope may be formed by providing a first glass sheet having a first side and a second side and doped with Ag or Au, irradiating a portion of the glass sheet with a first optical energy, heating treating the glass sheet at a temperature of at least about 480° C., positioning the glass sheet over a substrate, and exposing the irradiated portion of the glass sheet to a second optical energy to fuse the glass sheet to the substrate and form a cavity therebetween.

Preferably, the glass sheet has a homogeneous chemical composition. At least a portion of the first side of the glass sheet is irradiated at a wavelength of about 248 nm, such as, for example, through a mask. Preferably, the irradiated portion of the glass sheet forms a pre-determined pattern on the first side of the sheet. The pre-determined pattern is preferably a closed path. Preferably, the glass sheet is heat treated for at least about 2 minutes; more preferably at least about 10 minutes.

In still another embodiment, a method of making a glass envelope comprises providing a first glass sheet having a first side and a second side and doped with Ag or Au, irradiating a portion of the first side of the glass sheet at a wavelength of about 248 nm, heating treating the glass sheet at a temperature of at least about 480° C., positioning the glass sheet over a substrate, and exposing the irradiated portion to optical energy at a wavelength between about 300 nm and 600 nm to fuse the glass sheet to the substrate and form a cavity therebetween. A typically sealing laser may be, for example, a Nd:YAG laser.

Preferable, the substrate comprises an electro-luminescent material; more preferably, the electroluminescent material is an organic material.

In another embodiment according to the present invention, the glass sheet is irradiated on both the first side and the second side. The glass sheet may thereafter be sealed to the substrate according to the method disclosed above. A second glass sheet may then be sealed to the first glass sheet by placing the second glass sheet overtop the first glass sheet, and irradiating the pre-determined pattern on the second side of the first glass sheet with the sealing laser, thereby sealing the second glass sheet to the first glass sheet.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

DETAILED DESCRIPTION

Figure 1:
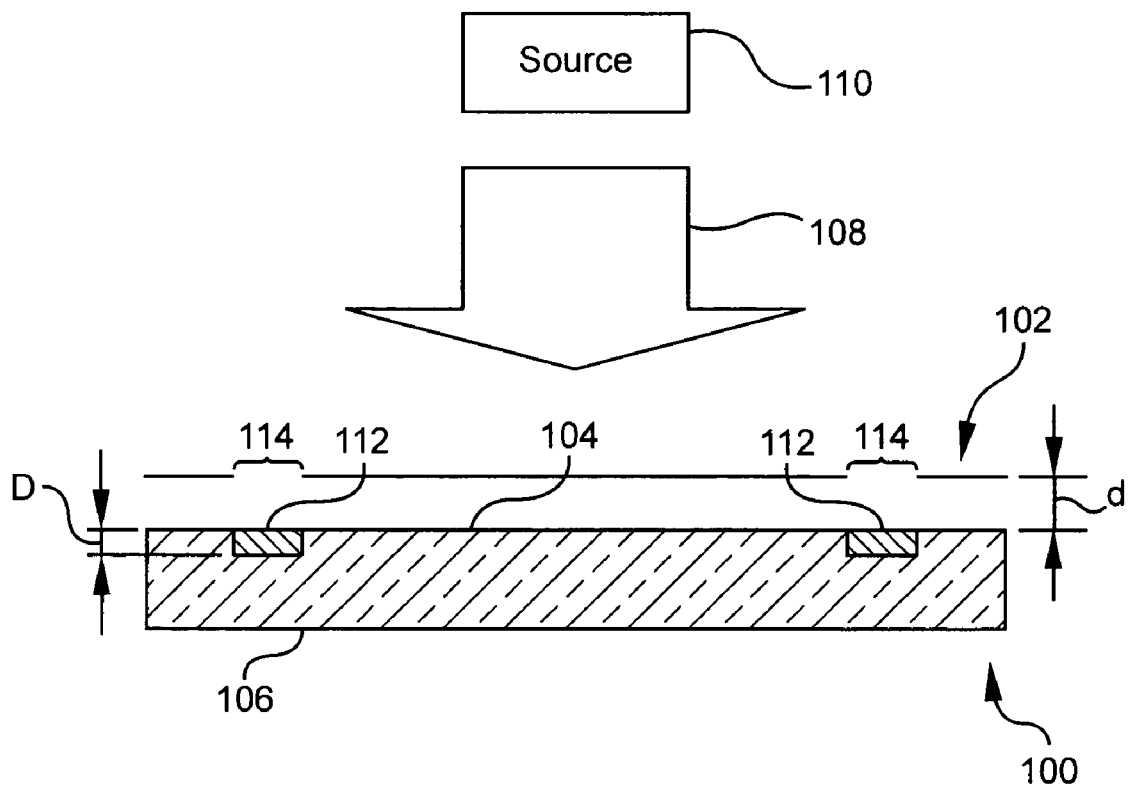
FIG. 1 is a side cross section view of an apparatus according to a method of the present invention showing the irradiation of a glass sheet through a mask.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Broadly, and in accordance with an embodiment of the present invention, the optical absorption of a portion of a photosensitive glass sheet may be selectively increased by exposure to optical energy at a pre-determined wavelength from a suitable source in a pre-determined pattern, preferably using a laser, followed by heat treatment of the glass. The glass sheet may thereafter be sealed to a substrate using a sealing laser which emits an optical energy at a wavelength which is absorbed by the irradiated and heat treated portion or portions of the sheet. Absorption by the irradiated and heat treated portion of the glass sheet heats the irradiated portion to at least the softening temperature of the glass, thereby bonding the glass sheet to the substrate.

In the illustrative embodiment depicted in FIG. 1, glass sheet 100 doped with silver (Ag) or gold (Au) is exposed to optical energy at a wavelength of about 248 nm. In some instances the glass may comprise a halide to increase the sensitivity of the glass to the exposure. Preferably, the halide is chlorine (Cl), bromine (B), iodine (I), fluorine or combinations thereof. The glass sheet is preferably silica based, wherein the majority (>50%) constituent of the glass sheet composition is $SiO_2$. An exemplary glass composition comprises silica ($SiO_2$) in an amount of between about 60 wt. % and 70 wt. %, $B_2O_3$ in an amount between about 14.5 wt. % and 17 wt. %, ZnO in an amount of about 5 wt. %, F in an amount of about 1.7 wt. %, $Sb_2O_3$ in an amount between about 0 and 2 wt. %, Ag in an amount between about 0.22 and 0.66 wt. %, and Cl in an amount of about 0.22 wt. %. For example, a suitable glass sheet may comprise about 64.55 wt. % $SiO_2$, 16.06 wt. % $B_2O_3$, 0.32 wt. % Ag, 0.21 wt. % Cl, 7.02 wt. % $Na_2O$, 1.64 wt. % F, 0.96 wt. % $Sb_2O_3$, 4.81 wt. % ZnO, and 2.89 wt. % $Al_2O_3$.

As shown in FIG. 1, mask 102, such as a chrome mask, may be placed over glass sheet 100 comprising first side 104 and second side 106, and glass sheet first side 104 subsequently irradiated through mask 102 by light 108 emitted by source 110 to preferentially irradiate region 112 of the glass sheet. Preferably, light 108 comprises a wavelength of approximately 248 nm. Mask 102 may contact glass sheet 100, but is preferably separated (offset) from the glass sheet by distance d. A typical separation distance d is 0.2 mm. Preferably, light source 110 comprises a KF excimer laser operated in a pulsed mode. Typical irradiation powers may be between about 20 mJ/cm$^2$ and 40 mJ/cm$^2$. The glass sheet is irradiated for a period of time between about 1 minute and 5 minutes. A typical irradiation time is about 1 minute when the laser is operated at a pulse rate of about 10 hz. The depth of region 112 may be controlled by adjusting the exposure of region 112, such as by increasing the pulse rate, by increasing the total exposure time, or a combination of both.

Figure 2:
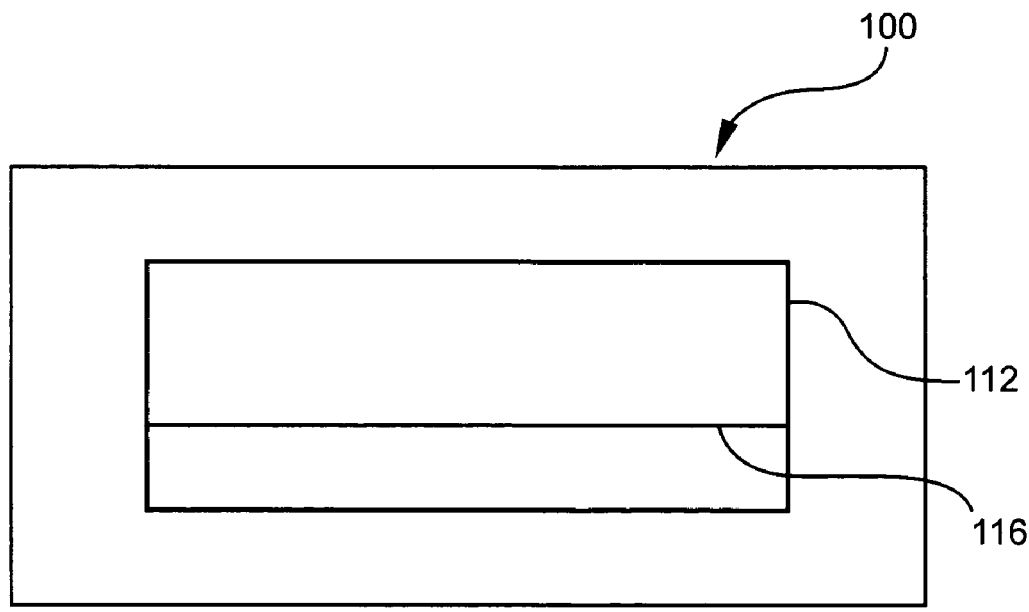
FIG. 2 is a top view of a glass sheet according to an embodiment of the present invention, showing an outline of a region of the glass sheet which has been irradiated through a mask.

Mask 102 includes openings 114 that provide for the irradiation of only selected regions 112 of the glass sheet to be irradiated. As shown more clearly in FIG. 2, in the instance where a glass envelope is to be made using glass sheet 100, irradiated region 112 may advantageously be in the shape of a frame bordering region 116 which has not been irradiated, and which frame depends along the glass sheet, preferably adjacent to the periphery of the glass sheet. It will be recognized that irradiated region 112 may be in any suitable shape which forms the desired irradiated region on the glass sheet, but the shape preferably defines a closed path; more preferably a closed path which forms an approximately polygonal shape. By approximately what is meant is that the polygonal shape may have, for example, rounded corner segments. In a preferred embodiment, a plurality of irradiated regions 112 may be formed on a single glass sheet which may thereafter be separated into a plurality of smaller glass sheets, each smaller glass sheet having one or more irradiated regions. Each glass sheet having an irradiated region may then be bonded to a substrate to form a glass envelope.

In an alternative approach, the irradiating laser may be used to "write" a pattern onto the glass sheet without the need for a mask by moving a focused laser beam relative to the glass sheet, however such methods may be less desirable in a production environment where the exposure time becomes cost prohibitive.

Once glass sheet 100 has been irradiated, the glass sheet is thereafter heat treated. Preferably, the glass sheet is heat treated at a temperature of at least about 480° C.; more preferably between about 500° C. and 600° C. Preferably the glass sheet is heat treated for at least about 2 minutes; more preferably at least about 10 minutes. Heat treatment may be continued for up to about 2 hours, however, heat treatment in excess of about 2 hours may reduce the contrast between the irradiated glass and the glass which has not been irradiated. That is, the transition in absorption between the irradiated portion of the glass and the portion which has not been irradiated may become less sharp.

Figure 3:
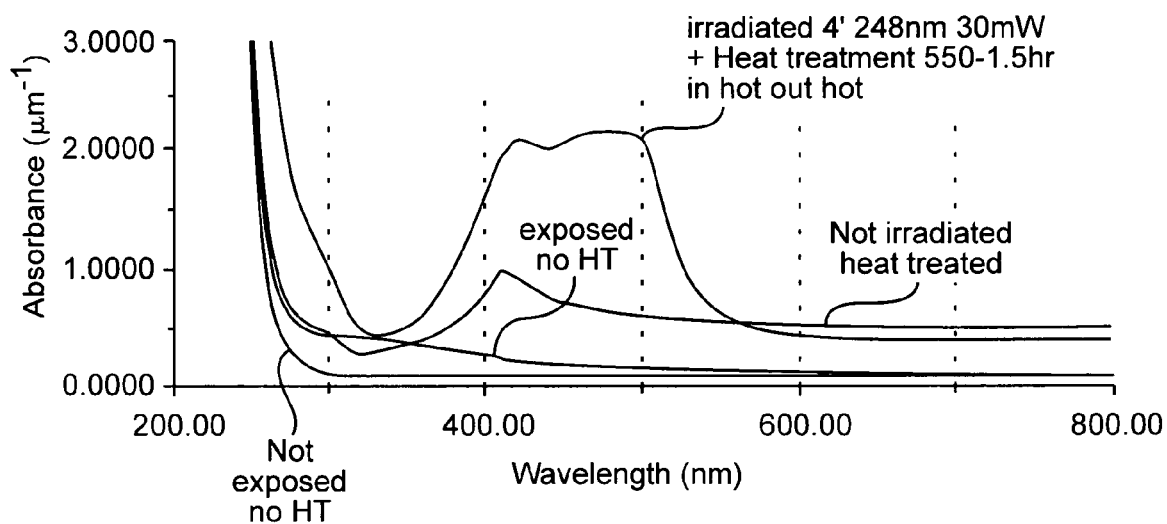
FIG. 3 is a plot of transmittance (absorption) curves for four identical glass samples under varying process conditions, showing the effectiveness of an embodiment of the method according to the present invention.
Figure 4:
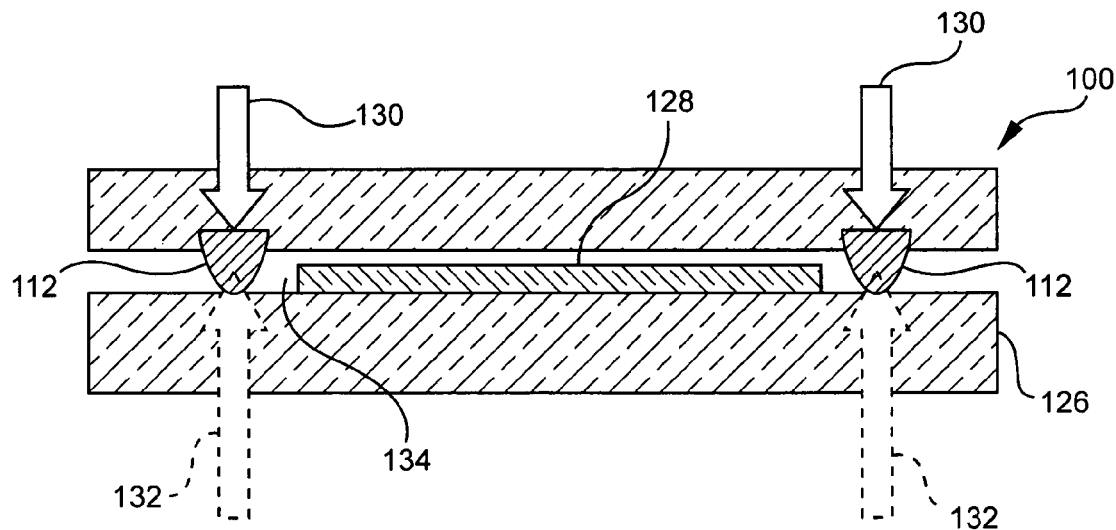
FIG. 4 is a plot showing the amount of swelling of the glass surface which has been irradiated, heat treated, and exposed to a sealing laser according to an embodiment of the present invention.

FIG. 3 shows absorbance spectra curves (absorbance as a function of wavelength), where the absorbance is expressed in mm$^{-1}$, for four glass samples under varying process conditions. The glass sheet samples each comprised about 64.55 wt. % $SiO_2$, 16.06 wt. % $B_2O_3$, 0.32 wt. % Ag, 0.21 wt. % Cl, 7.02 wt. % $Na_2O$, 1.64 wt. % F, 0.96 wt. % $Sb_2O_3$, 4.81 wt. % ZnO, and 2.89 wt. % $Al_2O_3$, 0.01 wt. % CaO, 0.01 wt. % $SO_3$ and 1.52 wt. % $H_2O$.

As shown in FIG. 3, curve 118 depicts the absorption curve for a first glass sample prior to being irradiated with a KF excimer laser. A sharp ultraviolet (UV) absorption transition can be seen at a wavelength of about 275 nm. That is, at about 275 nm the glass is seen to exhibit a rapid decrease in absorption. Curve 120 shows the absorption curve for a glass sample which was irradiated, but not heat treated. A UV transition similar to that depicted by curve 118 is seen. Curve 122 shows an absorption curve for a glass sheet sample which was heat treated only. A UV transition similar to curves 118 and 120 is observed, however the sample is seen to exhibit an increased absorption at wavelengths greater than about 350 nm (compared with curve 118), with a maximum absorption at a wavelength of about 400 nm. Finally, curve 124 represents a glass sample which was treated in accordance with the present invention, wherein the glass was first irradiated with light having a wavelength of about 248 nm for about 4 minutes, then heat treated at a temperature of 550° C. for about 1.5 hrs. Curve 124 depicts a significantly increased absorption over the wavelength range of about 325 nm to about 600 nm, with a broad peak absorption over a wavelength range of approximately 400 nm to about 500 nm. After 500 nm the absorption of the glass sample decreases rapidly.

After the glass sheet has been heat treated, the heat treated glass sheet may thereafter be placed over a substrate with irradiated first side 104 of the glass sheet facing substrate 126. Substrate 126 typically comprises a glass or glass ceramic, and preferably includes one or more layers of light emitting materials 128 deposited thereon. For example, the light emitting materials may comprise one or more organic light emitting layers. Other layers, such as anode or cathode layers, may also be included. The glass sheet may thereafter be heated, such as by a suitable sealing laser, along previously irradiated region 112. Preferably, the sealing laser has an emission peak in the wavelength range between about 300 nm and 600 nm; more preferably between about 355 nm and 532 nm; more preferably still the sealing laser has an emission peak at about 420 nm. A Nd:YAG laser, for example, is a suitable sealing laser. Advantageously, the irradiated region may be heated by exposing the irradiated region to the sealing laser light through second side 106 of the glass sheet as indicated by arrows 130, or, if the substrate is substantially transparent at the wavelength of the heating laser light, the irradiated region may be heated by directing optical energy from the heating laser onto the irradiated region through substrate 126 as shown by arrows 132. Thus, the present embodiment provides for sealing of the glass cover sheet to the substrate either from the top of the glass sheet or from the bottom of the substrate. Advantageously, substrate 126 may be of the same glass composition as glass sheet 100, but without having been first irradiated at a wavelength of about 248 nm, then heat treated, thereby allowing a glass envelope to be manufactured using only a single glass composition rather than separate compositions for the substrate and the glass sheet. More simply put, the glass sheet may be sealed to the substrate by the sealing laser from above or below the cover glass. Moreover, unlike prior art methods which utilize a glass sheet which is absorbing in its entirety, only a shallow surface region of the glass sheet according to the present invention is made absorbing by the irradiation and subsequent heat treatment, typically to a depth D of less than about 300 μm. Sealing of the glass sheet to the substrate is greatly improved using the method of the present invention, e.g. only the shallow irradiated region 112 of glass at the sealing interface between the cover glass and the substrate is preferentially heated. In addition, because only irradiated region 112 on glass sheet 100 undergoes a significant increase in absorption, the remainder of glass sheet 100 retains a high transmittance (e.g. >90%), allowing the electro-luminescent device to transmit efficiently through the cover glass and/or the substrate.

Figure 5:
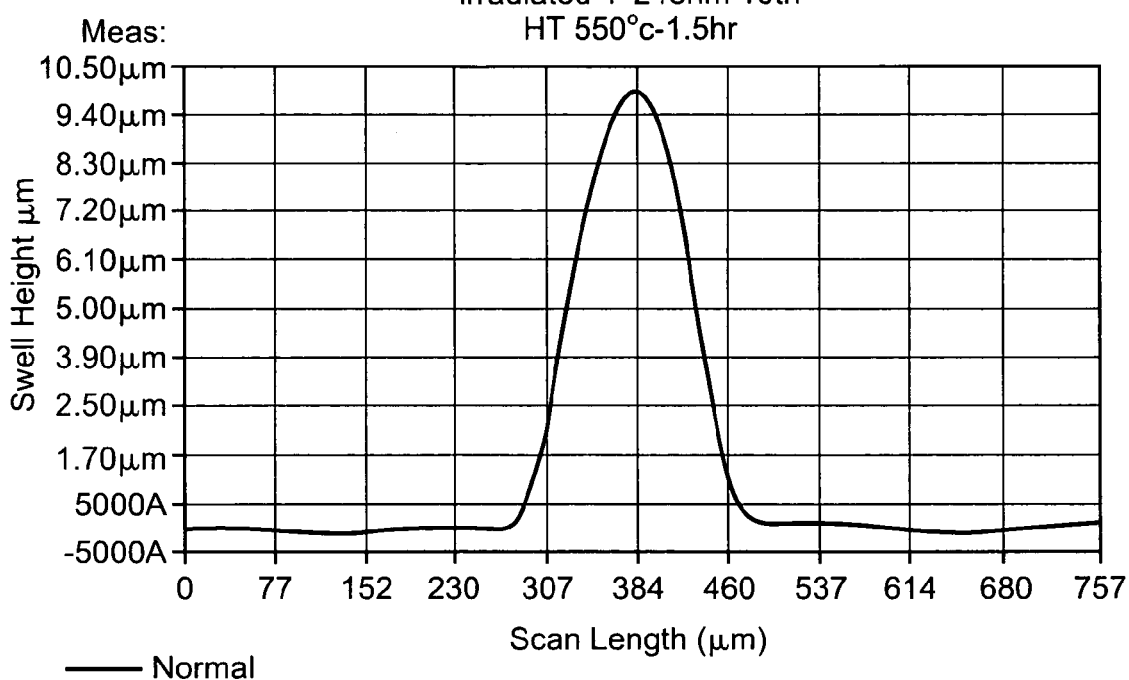
FIG. 5 is a side cross sectional view of a glass envelope formed in accordance with an embodiment of the present invention.

When irradiated region 112 on glass sheet 100 is heated to a softening temperature by the sealing laser, irradiated region 112 swells in response, forming cavity 134 to contain the electro-luminescent element and bonding glass sheet 100 to substrate 126 at irradiated region 112. FIG. 5 shows a typical swelling distance exhibited by a sample of glass having a composition 64.55 wt. % $SiO_2$, 16.06 wt. % $B_2O_3$, 0.32 wt. % Ag, 0.21 wt. % Cl, 7.02 wt. % $Na_2O$, 1.64 wt. % F, 0.96 wt. % $Sb_2O_3$, 4.81 wt. % ZnO, and 2.89 wt. % $Al_2O_3$, 0.01 wt. % CaO, 0.01 wt. % $SO_3$ and 1.52 wt. % $H_2O$. The sample was irradiated for 4 minutes at a wavelength of 248 nm using a pulsed KF excimer laser operating at 10 hz. The sample was then heat treated at a temperature of about 550° C. for about 1.5 hours and a portion thereof subsequently heated with a Nd:YAG sealing laser from the side opposite the irradiated region. As indicated, the region of the glass sheet which was irradiated, heat treated and thereafter heated with the sealing laser swelled such that the surface of the irradiated region of the glass sheet extended approximately 10 μm above the surface of the glass sheet which had not been irradiated at 248 nm.

Figure 6:
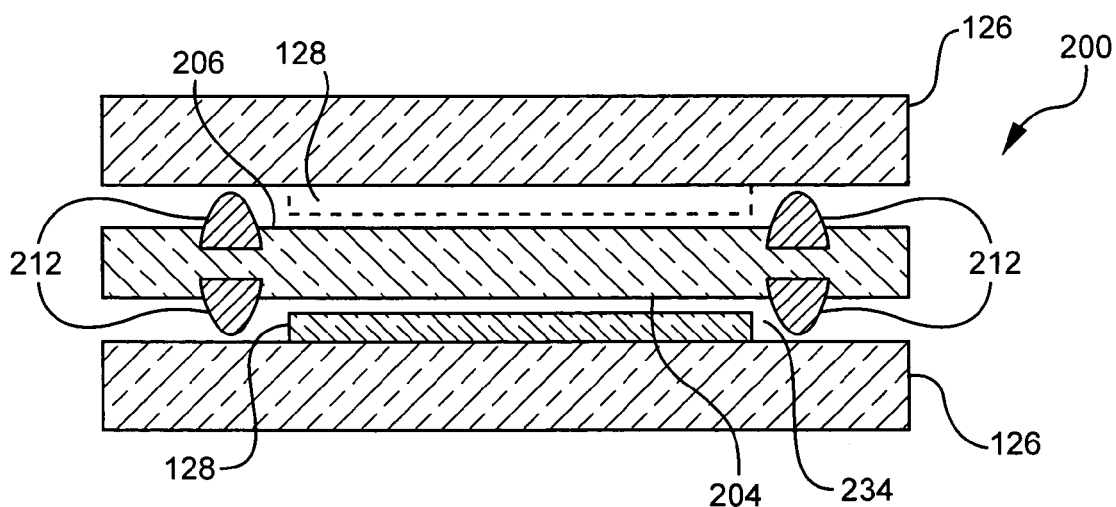
FIG. 6 is a side cross sectional view of a glass envelope formed in accordance with another embodiment of the present invention.

In another embodiment, illustrated in FIG. 6, a first glass sheet 200 may be preferentially irradiated at wavelength of 248 nm through a mask to produce irradiated region 212 having a pre-determined shape as described above. In the embodiment depicted in FIG. 6, both sides of glass sheet 200 may be preferentially irradiated. Glass sheet 200 is then heat treated as disclosed hereinabove, and first side 204 sealed to substrate 126 using a suitable sealing laser, as also previously described, thereby forming cavity 234. Preferably, glass sheet 200 is sealed to substrate 126 by directing light from the sealing laser through the substrate. A second substrate 126, on which one or more electro-luminescent layers may be deposited, may then be similarly sealed to second side 206 of first glass sheet 200, preferably by directing light from a sealing laser through the second glass sheet or substrate.

In yet another embodiment, the coefficient of absorption of a pre-determined portion of a glass sheet is modified by conventional ion exchange methods. For example, a pre-determined portion of the glass sheet may undergo ion exchange to incorporate copper ions in the glass according to a pre-determined pattern. Once the pre-determined portion of the glass sheet has undergone a change in coefficient of absorption, a sealing laser which emits at a wavelength which is significantly absorbed by the pre-determined portion is used to seal the glass sheet to a substrate in a manner similar to that previously described.

Figure 7:
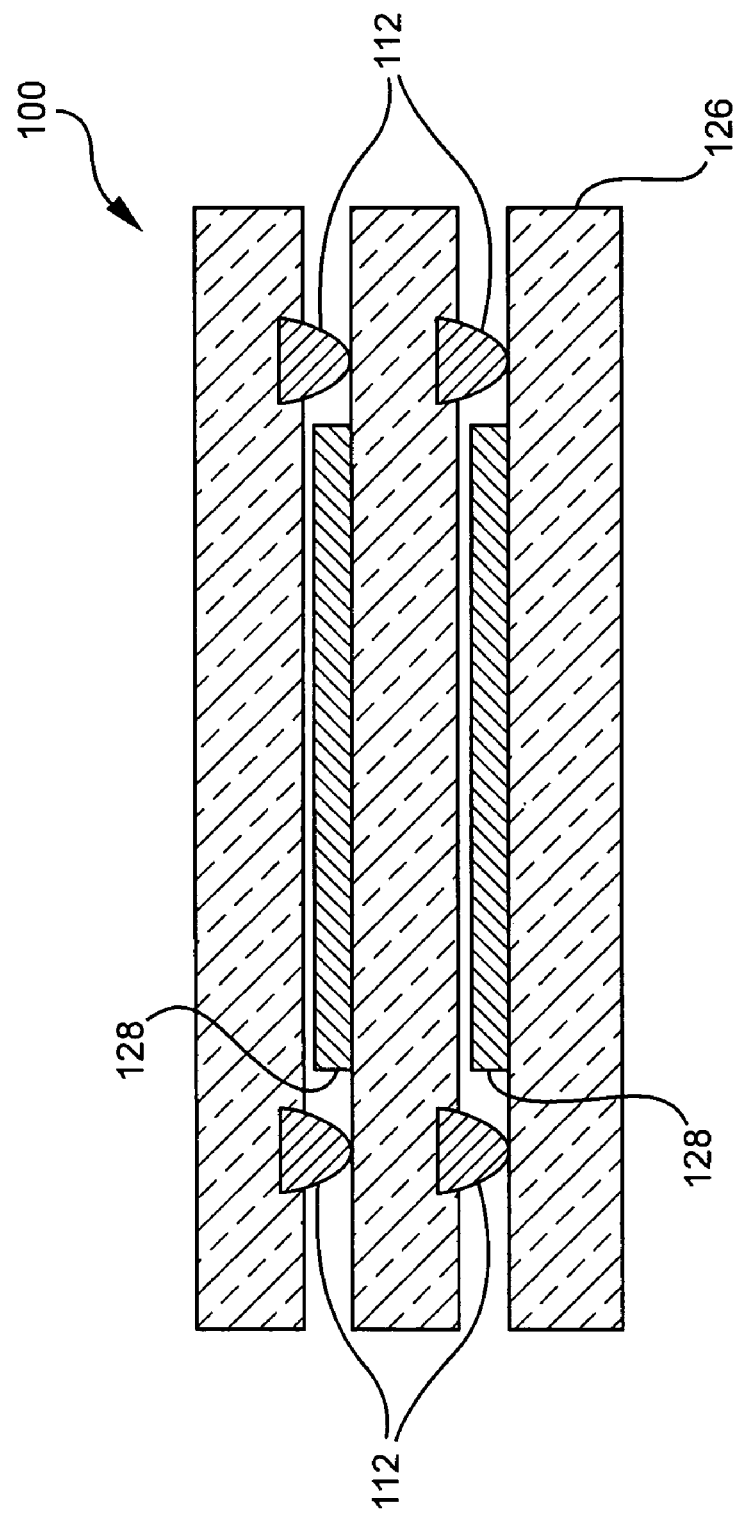
FIG. 7 is a side cross sectional view of a glass envelope in accordance with yet another embodiment of the present invention wherein successive glass sheets are stacked and sealed.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, as shown in FIG. 7, first glass sheet 100 may be irradiated on only one side, heat treated and sealed to a substrate as previously described. A second glass sheet 100 may also be irradiated on one side, heat treated, and sealed to the second side 106 of first glass sheet 100 via irradiated portion 112 of second glass sheet 100. In this way a successive number of glass sheets may be sealed, one to another, in a stack. First glass sheet 100 may serve as a substrate for additional electro-luminescent elements. All such modifications and variations are intended to be included herein within the scope of this disclosure and the present invention and protected by the following claims.

What is claimed is:

1. A method for making a glass envelope comprising:
   providing a first glass sheet having a first side and a second side and doped with Ag or Au;
   irradiating a portion of the glass sheet with a first optical energy;
   heating treating the glass sheet at a temperature of at least about 480° C.;
   positioning the glass sheet over a substrate; and
   exposing the irradiated portion of the glass sheet to a second optical energy to fuse the glass sheet to the substrate and form a cavity therebetween.

2. The method according to claim 1 wherein the first optical energy is at a wavelength of about 248 nm.

3. The method according to claim 1 wherein the second optical energy is at a wavelength of between about 300 nm and 600 nm.

4. The method according to claim 1 wherein the step of irradiating comprises irradiating through a mask.

5. The method according to claim 4 wherein the second optical energy has a wavelength of about 420 nm.

6. The method according to claim 1 wherein the irradiated portion comprises a closed path on the first side.

7. The method according to claim 1 wherein the glass sheet comprises a plurality of irradiated patterns.

8. The method according to claim 1 wherein an electroluminescent layer is disposed within the cavity.

9. The method according to claim 8 wherein the electroluminescent layer comprises an organic material.

10. The method according to claim 1 wherein a chemical composition of the glass sheet and a chemical composition of the substrate are substantially the same.

11. The method according to claim 1 wherein the glass sheet is heat treated for a period of at least about 2 minutes.

12. The method according to claim 1 wherein the glass sheet is heat treated for at least about 1 hour.

13. The method according to claim 1 wherein the glass sheet comprises Ag or Au in an amount between about 0.22 wt. % and 0.66 wt. %.

14. The method according to claim 1 wherein the irradiated portion is less than about 300 mm deep.

15. A method for making a glass envelope comprising:
   providing a first glass sheet having a first side and a second side and doped with Ag or Au;
   irradiating a portion of the first side of the glass sheet at a wavelength of about 248 nm;
   heating treating the glass sheet at a temperature of at least about 480° C.;
   positioning the glass sheet over a substrate; and
   exposing the irradiated portion to optical energy at a wavelength between about 300 nm and 600 nm to fuse the glass sheet to the substrate and form a cavity therebetween.

16. The method according to claim 15 further comprising irradiating a portion of the second side of the first glass sheet at a wavelength of about 248 nm.

17. The method according to claim 15 further comprising sealing a second glass sheet to the first glass sheet.

* * * * *

UNITED STATES PATENT AND TRADEMARK OFFICE
CERTIFICATE OF CORRECTION

PATENT NO. : 7,565,817 B2  Page 1 of 1
APPLICATION NO. : 11/303578
DATED : July 28, 2009
INVENTOR(S) : Joseph Francis Schroeder, III et al.

It is certified that error appears in the above-identified patent and that said Letters Patent is hereby corrected as shown below:

| No. | Col. | Line | Description |
|---|---|---|---|
| 1 | 4 | 16 | Please delete "comer" and insert --corner-- |

Signed and Sealed this

Twenty-fourth Day of November, 2009

David J. Kappos
*Director of the United States Patent and Trademark Office*